US008311901B1

(12) United States Patent
Carmichael et al.

(10) Patent No.: US 8,311,901 B1
(45) Date of Patent: Nov. 13, 2012

(54) METHODS AND SYSTEMS FOR DISTRIBUTING PRODUCTS VIA A WIDE-AREA NETWORK SUCH AS THE INTERNET

(75) Inventors: Chris Carmichael, Laguna Niguel, CA (US); Don Magnuson, San Clemente, CA (US); Connie Jordan, Laguna Niguel, CA (US); Greg Crotty, Moris Plains, NJ (US)

(73) Assignee: International Apparel Group, LLC, Aliso Viejo, CA (US)

( * ) Notice: Subject to any disclaimer, the term of this patent is extended or adjusted under 35 U.S.C. 154(b) by 345 days.

(21) Appl. No.: 09/710,690

(22) Filed: Nov. 10, 2000

Related U.S. Application Data

(60) Provisional application No. 60/288,190, filed on Aug. 25, 2000.

(51) Int. Cl.
*G06Q 10/00* (2012.01)
(52) U.S. Cl. ........................................... 705/28
(58) Field of Classification Search .............. 705/22, 705/26, 28
See application file for complete search history.

(56) References Cited

U.S. PATENT DOCUMENTS

| | | | | |
|---|---|---|---|---|
| 4,797,818 | A | | 1/1989 | Cotter ............................. 705/15 |
| 5,710,887 | A | * | 1/1998 | Chelliah et al. ................. 705/26 |
| 5,978,774 | A | | 11/1999 | Rogers et al. ................... 705/24 |
| 5,991,739 | A | * | 11/1999 | Cupps et al. .................... 705/26 |
| 6,009,407 | A | | 12/1999 | Garg ............................... 705/10 |
| 6,085,172 | A | | 7/2000 | Junger ............................. 705/28 |
| 6,115,690 | A | * | 9/2000 | Wong ............................. 705/34 |
| 6,249,772 | B1 | | 6/2001 | Walker et al. ................... 705/26 |
| 6,381,583 | B1 | * | 4/2002 | Kenney ........................... 705/26 |
| 2001/0032147 | A1 | * | 10/2001 | Siegel ............................. 705/26 |
| 2002/0038261 | A1 | * | 3/2002 | Kargman et al. ............... 705/26 |
| 2002/0072984 | A1 | * | 6/2002 | Rothman et al. ............... 705/26 |
| 2007/0174144 | A1 | * | 7/2007 | Borders et al. .................. 705/27 |

OTHER PUBLICATIONS

Dennis, Kathryn, "Net Serves Up Service", Dec. 1996, Marketing Computers, vol. 16, No. 11, p. 56.*

(Continued)

*Primary Examiner* — Russell S Glass
(74) *Attorney, Agent, or Firm* — Law Office of Scott C. Harris, Inc.

(57) ABSTRACT

Systems and methods for distributing products using a wide area or global computer network are provided. A method for distributing products is provided wherein a request for a product is received from a consumer, preferably using a web based interface. An indirect seller provides the web based interface and preferably maintains the inventory management system. A retailer to fulfill the consumer request for product is determined based upon the nearest retailer to the consumer that has current stock of the requested. Inventory levels of product are maintained by an inventory management system that receives shipping information from manufacturers regarding shipments of products from the manufacturers to retailers and sales information from retailers reflecting sales of products from the retailers to consumers. A terminal may also be provided at retail locations to enable users of the terminal to interact with the inventory management system while at a physical retail location. The inventory management system reconciles the shipment and sales information to provide an accurate accounting of quantities of products actually sold to consumers and to provide an accurate accounting to the manufacturers of inventory levels at the retailers. The inventory management system is further capable of processing payment information from consumers, retailers, and factors in order to provide funds to manufacturers in an expeditious manner. The inventory management system preferably is maintained and operated from a server remotely located from the consumers.

10 Claims, 5 Drawing Sheets

OTHER PUBLICATIONS

Michel, Roberto, Manufacturing Systems, v15. n7 pp. 28-92, Jul. 1997.*

Virtual Retailing: Do It Best Introduces On-Line Hardware Retailing Site, Do-It-Yourself Retailing, vol. 177, N1, p. 80(1), Jul. 1999, The Gale Group 2001.

Fetto, John, Twas Long Before Christmas, American Demographics, nISSN 0163-4089, Aug. 1999, The Gale Group 2001.

Springer, Jon, Shopeaze, Haggen to Collaborate on Website, Supermarket News, p. 15, May 29, 2000, The Gale Group 2001.

* cited by examiner

FIG. 5

METHODS AND SYSTEMS FOR DISTRIBUTING PRODUCTS VIA A WIDE-AREA NETWORK SUCH AS THE INTERNET

CROSS-REFERENCE TO RELATED APPLICATIONS

This application claims the benefit of U.S. Provisional Application No. 60/228,190 filed Aug. 25, 2000, the disclosure of which is incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The field of the present inventions relates generally to product distribution systems, and more particularly to centralized distribution methods and systems operated on a wide-area network, i.e., a global computer network such as the internet. With the increased usage of the internet amongst the general population, many retailers and manufacturers have turned to the internet as a means to sell products to consumers. Unfortunately, current methods of conducting electronic commerce ("ecommerce") have proved suboptimal for retailers, manufacturers, and their consumers.

For example, one of the advantages that a retailer seeks when conducting ecommerce is to eliminate or reduce many of the costs of conducting business through a traditional brick and mortar store front. In practice, however, ecommerce retailers ("etailers") have been forced to create their own product distribution systems, such as, e.g., maintaining a large network of physical warehouses, thereby vitiating many of the cost savings they originally thought they would realize.

Manufacturers have also faced distribution hurdles when attempting to implement ecommerce strategies. Generally, manufacturers are prepared to distribute their products in bulk to retailers, who then would distribute products to individual consumers. A problem manufacturers must solve when trying to implement a web presence, and ecommerce, is that they must now distribute small quantities of product to individual consumers, rather than the customary bulk quantities to retailers. Another problem manufacturers face is that their retailer relationships may suffer if the retailers complain about lost sales due to the manufacturers' decision to sell directly to a consumer via a web site.

Additionally, with both traditional and ecommerce distribution strategies, manufacturers have typically been unable to capture a complete picture of the final distribution of their products to consumers. This results from the current distribution between manufacturers and retailers wherein retailers place bulk orders from manufacturers, typically at trade shows, that is meant to maintain a supply of product for a given time period, such as a season, a quarter, etc. The current relationship normally results in inefficiencies on many levels. When retailers order too much product, discounting of the manufacturers' products at the end of a time period results. When retailers order too little product, consumers are left unserved or underserved. In certain cases, retailers may purposefully order too much product in order to sell that product to other retailers with whom the manufacturer does not have, or has chosen not to have, a relationship. This type of activity is referred to as "backdooring" product. Due to these, and other, inefficiencies in the distribution chain from manufacturer to retailer, manufacturers often suffer from decreased brand protection and decreased customer loyalty. The current arrangements also deprive manufacturers of valuable direct market data, i.e., exactly what is being sold to consumers, since retailers maintain the direct sales information.

The individual consumer is also not always satisfied with the current ecommerce experience. Currently, buying from etailers is much like purchasing from catalogs. The consumer will order from a web site run by an etailer who will typically ship the product to the consumer from a remote warehouse. With current ecommerce methods, consumers are deprived of the in-person customer service that they normally received when shopping at a physical store. Also, consumers dealing with an etailer who only ships from a remote warehouse and does not maintain a physical store front will often encounter problems returning merchandise when their orders are unsatisfactory. Moreover, current ecommerce methods typically do not allow consumers the option of picking up items from or returning items to a physical location near their residence, thereby causing more inconveniences for the typical consumer.

Those skilled in the art have failed to provide for a fully integrated product distribution method that enables retailers, manufacturers, and indirect sellers, such as, e.g., ecommerce web sites, to better implement ecommerce strategies. Consequently, the present inventors have recognized a need for a distribution method and system that enables manufacturers to implement ecommerce strategies without having to establish their own consumer distribution networks, that enables indirect sellers and retailers to conduct ecommerce without having to establish costly, and counterintuitive, physical warehouse locations, and that enables consumers to benefit from dealing with a local retailer rather than only with a remotely located etailer. The present inventions address these and other problems.

SUMMARY OF THE INVENTION

The present inventions are directed to methods of distributing products using a wide area network, systems to distribute products while utilizing a wide are network, and methods for providing sales statistics to manufacturers and retailers, where the system and methods are operated using, or over, a wide area network or a global computer network.

In accordance with one aspect of the present inventions, a method of distributing products using a wide area network is provided. In a preferred embodiment, a request for a product is received from a consumer who is located at a specific location. Requests may be received via a web based interface that is incorporated as part of an inventory management system. Using the location of the consumer, an appropriate retailer is determined in order to fulfill the request. The appropriate retailer has physical stock of the product and is preferably the retailer nearest to the consumer that has such stock. In one embodiment, the postal zip code of the consumer is used to determine the appropriate retailer. After a retailer is determined, the request from the consumer is submitted to the retailer for subsequent fulfillment. The request may be fulfilled by shipping the product to the consumer or by allowing the consumer to pickup the product from the retailer's physical store. When the consumer picks up the product from the retailer, the consumer is provided with a copy of the request that also includes a code that is assigned to that request. The retailer is also provided with the code to enable the retailer to properly provide the consumer with the requested product at the time of pick up.

Additionally, an inventory management system for tracking of product sales is maintained. The inventory management system tracks individual sales of product by receiving reports of shipments of products from manufacturers to retailers and of sales from retailers to consumers. The inventory management system then reconciles the reports of shipments to retailers and sales to consumers to determine an accurate accounting of quantities of products actually sold to consumers, rather than just items shipped to retailers.

A terminal may also be provided at the retailer's location in order to allow a user, either a consumer or the retail staff, to communicate directly with the inventory management system. The terminal may be a kiosk, a PC, or any other device suitable for interacting with the system from the retailer's location. In this embodiment, a request for product is received from a user of the terminal. This request is transmitted from the terminal to the inventory management system. Using the request, a retail location with stock of the product is identified and the location is transmitted from the inventory management system to the terminal. Finally, the identified retail location is displayed to the user via a display on the terminal.

The inventory management system is also capable of processing funds from retailers and consumers. Payment information is received from consumers and is converted to an electronic debit format if necessary. Payment information is also received from retailers and is likewise converted to an electronic debit format if necessary. Additionally, payment information may also be received from factors and converted to an electronic debit format. After processing the payment information, funds are provided to the appropriate manufacturers.

In accordance with another aspect of the present inventions, a system for distributing products utilizing a wide area network is provided. In a preferred embodiment, an inventory management system is designed to receive and maintain information on transfers of products from manufacturers to retailers, transfers of products from retailers to consumers, and payment information from retailers and consumers. The inventory management system also includes a web based interface designed to allow consumers to interact with the inventory management system. The inventory management system is preferably maintained and operated on a server that is capable of transmitting orders, for products, received from consumers to selected retailers. The server preferably is also capable of interacting with the inventory management system. In one embodiment, a terminal located at a retailer is also provided that is capable of providing inventory information to a user of the terminal. The terminal receives a request for inventory information on a product from the user, transmits the request to the inventory management system, receives inventory information, in the form of a retailer location, from the inventory management system, and displays the retailer location to the user.

The present inventions further include a method for providing sales statistics to manufacturers and retailers. Shipment information on products shipping from manufacturers to retailers and sales information on products provided to consumers by retailers is received. The shipment information and the sales information are maintained in a database. Subsequently, the shipment information and the sales information are analyzed to determine statistics on actual sales to consumers. These statistics may then be provided to manufacturers or retailers on request. Additionally, the actual sales may be further categorized by geographic territories.

These and other aspects of the present inventions are described herein in greater detail.

DETAILED DESCRIPTION

The present inventions focus on the quadrangular relationship between manufacturers, retailers, consumers, and indirect sellers, such as, e.g., web based ecommerce enablers, web sites, and other web based interfaces. The present inventions are configurable to any size manufacturer/retailer distribution chain in any industry of choice. In some embodiments, the present inventions reside at the indirect sellers. The present inventions form a business conduit that brings together the sectors of manufacturing, retail, inventory/asset management for both, and sales statistics.

Furthermore, the present inventions are capable of enabling routine ordering, shipping, tracking, and processing capital transactions between industry trading partners and an indirect seller in a seamless manner.

The present inventions will support and enhance a retailer's presence and image to a consumer, while promoting a manufacturer's products, and co-branding the indirect seller with the retailer and the manufacturer. They are designed to provide a comprehensive delivery system to a consumer based on supply and geography. The present inventions may notify retailers, in an interactive manner, of stock levels, and may expedite shipment from the manufacturer when necessary to satisfy store-level and ecommerce demand. The retailer may also receive the benefit of an indirect seller's pre-negotiated shipping rates, if available.

The present inventions will benefit an indirect seller by providing for the order and fulfillment of manufacturer products, showcased on the indirect seller's web site for example, by using a preexisting retail outlet or chain as the supplier or fulfillment agent. Therefore, the indirect seller need not carry physical inventory. This will enable the indirect seller to focus its resources on product marketing, for example, without expending resources on carrying inventory. Indirect sellers will be free to showcase product choices to consumers, focusing the consumers' attention on the details and specifications of the product, as well as how the product functions and fits, without being concerned with maintaining physical inventory levels for fulfillment of any consumer orders or requests for products.

Figure 1:
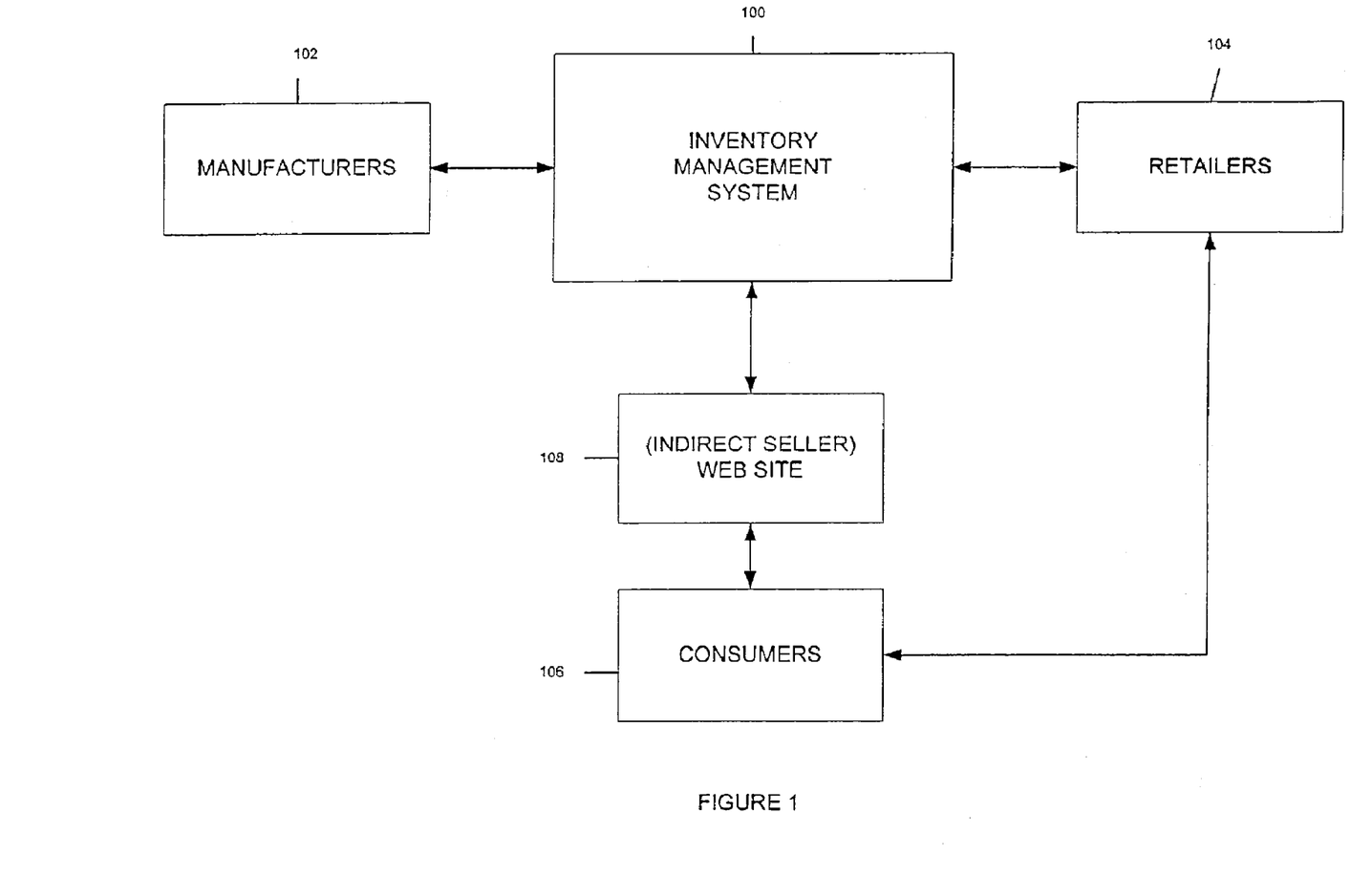
FIG. 1 is a flow chart illustrating one embodiment of the distribution method of the present inventions.

Turning to FIG. 1, one embodiment of the distribution method of the present inventions is illustrated. An inventory management system ("IMS") 100 receives information from manufacturers 102 regarding the manufacturers' 102 shipments of products to retailers 104. This communication from the manufacturers 102 to the IMS 100 may take the form of a suitable electronic data interchange ("EDI") format. Additionally, the communication may be sent in any suitable manner, including a transmission using a wide area or global computer network such as the internet, a transmission over a local network established between the IMS 100 and a particular manufacturer, or a wireless transmission. The IMS 100 maintains and stores the information from the manufacturers 102 in a database. Preferably, the IMS 100 and its associated databases are maintained on a server that is situated remotely from the manufacturers 102 and the retailers 104.

In a similar manner as with shipping information from the manufacturers 102, the IMS 100 additionally receives sales information from the retailers 104. The retailers 104 will transmit information on sales of products to consumers 106 to the IMS 100 using any suitable format, including any suitable EDI format. In one embodiment, the sales information comprises sales generated through an indirect seller 108, such as, e.g., a web site based etailer, and normal sales generated through walk-in traffic or other sales not originating from the indirect seller 108. In that embodiment, all sales from the retailers 104 are captured, not just sales generated by the indirect seller 108 nor just sales generated by traditional means.

The retailers 104 may transmit their sales information using any suitable manner, including a communication over a wide area or global computer network, a transmission over a direct connection between a particular retailer and the IMS 100, or a wireless transmission. In an alternative embodiment, the retailers 104 may transmit their information to the IMS 100 by entering the transaction into internet-enabled hardware or into a register system that interfaces to the internet-enabled hardware. This type of arrangement enables the retailers 104 to automatically transmit sales information on a real-time basis as the retailers 104 scan UPC codes or SKUs on products being sent to consumers 106. As with the shipping information received from manufacturers 102, the IMS 100 stores and maintains the sales information received from the retailers 104 in a database.

Accordingly, all inventory, from all manufacturers 102 and for every all participating retailers 104 is maintained by the IMS 100 and resides on a database system operated, and maintained by the IMS 100. The shipping information and the sales information may comprise product, action, and demographic information. The shipping information and the sales information will be used by the IMS 100 to generate specialized sales and marketing reports for the manufacturers 102 and the retailers 104, and will be discussed infra.

The IMS 100 may be designed to perform regular reconciliations of the shipping information received from the manufacturers 102 and the sales information from the retailers 104. These reconciliations may be performed on a daily basis, for example. Performing these regular reconciliations of shipping information and sales information would facilitate the manufacturers' 102 and retailers' 104 efforts to maintain consistent inventory control since either would be aware of update and accurate inventory levels, if they desired such reports from the IMS 100. Additionally, algorithms may be implemented by the IMS 100 that would enable the IMS 100 to determine if a specific product would need to be suggested to a particular retailer to stock or order based upon geographic or demographic demand for that product. These recommendations could be made at the request of either the manufacturers 102 or the retailers 104.

Preferably, the IMS 100 is maintained by the indirect seller 108. Moreover, the IMS 100 preferably includes an interface that enables consumers 106 to place requests for products to the indirect seller 108 that will ultimately be fulfilled by the retailers 104. This interface preferably is an internet based interface or a web based interface such as a web site. In a preferred embodiment, as shown in FIG. 1, the consumers 106 enter requests for product, such as, e.g. orders, using a web site that is maintained by the indirect seller 108 and is also included as part of the IMS 100.

Figure 2:
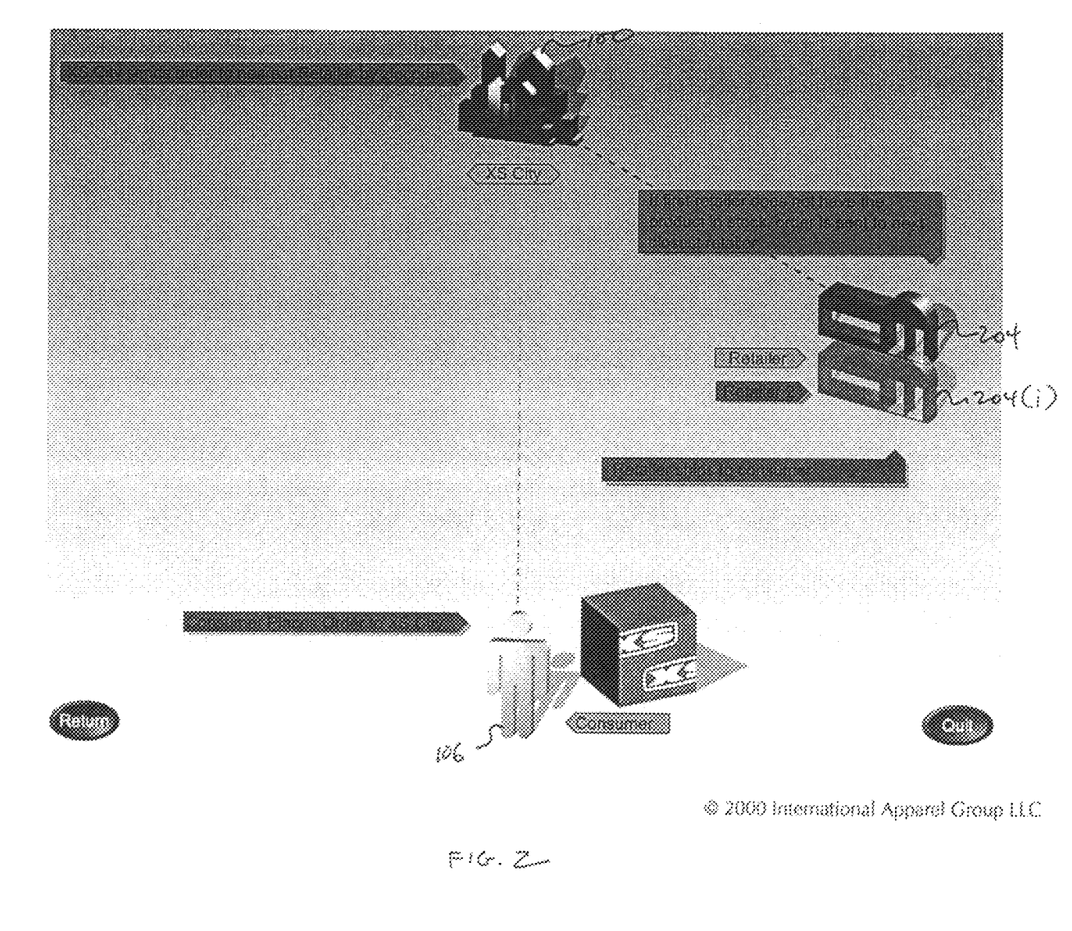
FIG. 2 is a generalized diagram of the process of the determination of a retailer to fulfill a consumer's request for a product.

The IMS 100 receives a request via the web site and determines the best retailer for fulfillment of the particular request. The request may be for a specific product or a specific product configuration. As seen in FIG. 2, the IMS 100 preferably determines an appropriate retailer 204 based upon the retailer closest in proximity to the consumer's 106 location which has current inventory of the requested product. This may be accomplished, for example, based upon the consumer's 106 postal zip code. If the closest retailer to the consumer 106 does not have active stock of the product, the IMS 100 will locate the next nearest retailer 204(*i*). The IMS 100 continues this process until a retailer is located that has stock of the product and is also located near the consumer 106. In one embodiment, if the IMS 100 continues this process and does not find a retailer with sufficient stock to fulfill the consumer's 106 order within a predetermined area, the IMS 100 will notify the consumer 106 that the product is not in stock. This notification preferably is accomplished by a notification displayed to the consumer 106 via the web based interface maintained by the indirect seller 108. The predetermined area may be based upon geographic considerations or delivery time considerations. For example, the IMS 100 may continue trying to find an appropriate retailer 204 within an area that is designated as a one to three day shipping time area relative to the consumer 106.

Once an appropriate retailer 204 is located, the IMS 100 transmits the consumer's 106 request to the appropriate retailer 204 for fulfillment. This may be accomplished, for example, by a facsimile transmission of a pick ticket/order form to the retailer 204 or by transmitting an electronic version of a pick ticket/order form to the retailer 204 via an appropriate means, such as, e.g., via a wide area or global computer network. In one embodiment, the retailer 204 will box and ship the product in branded packaging materials that are provided by the indirect seller 108. In this embodiment, the packing materials will display insignias representative of the indirect seller 108. In this manner, the indirect seller 108 will have the capability of fulfilling product requests placed through its web site without having to maintain physical inventory levels while still being able to provide the consumer 106 with a branded package. The retailer 204 also benefits since the retailer 204 does not lose a sale of product to the indirect seller 108 and the retailer 204 is also capable of participating in ecommerce without having to implement an internet strategy, such as operating its own web site. The fulfillment may be accomplished through a parcel shipping method such as, e.g., the United States Postal Service, any appropriate postal service if delivery is required in a foreign country, the United Parcel Service, Federal Express, or any other carrier that has the capability of delivering a product to a consumer 106.

When the retailer 204 ships product to the consumer 106, one embodiment of the present inventions enables the retailer 204 to ship the product using a shipping account with discounted shipping rates renegotiated by the indirect seller 108. When the retailer 204 uses a discounted shipping rate renegotiated by the indirect seller 108, the consumer 106 will also benefit from lower shipping costs.

Alternatively, the consumer 106 may be given the option of personally picking up a product from the appropriate retailer 204. If the consumer 106 indicates this preference to the IMS 100, the IMS 100 will provide the consumer 106 with a hard copy of the request. The hard copy preferably will include an identification code unique to that request, such as, e.g., a bar code. The IMS 100 will also notify the appropriate retailer 204 that the consumer 106 has chosen to personally pick up the product and will provide the retailer 204 with a copy of the request and any unique identifying number assigned to that request. The IMS 100 will provide a copy of the request and any unique identifying number via a suitable method such as, e.g., a facsimile transmission or an electronic transmission over a wide area or global computer network. The retailer 204 will then utilize the unique identifying number to both fulfill the request and to verify that the correct consumer is receiving the product when the consumer 106 personally picks up the product. In one embodiment, the retailer 204 will package the requested product in branded packaging provided by the indirect seller 108, as previously described.

Consumers 106 will also be given the option of returning unsatisfactory products to a local retailer. As previously described, retailers 104 will provide sales information to the IMS 100 for use by the IMS 100, along with the shipping information provided by the manufacturers 102 in maintaining inventory data and in generating inventory reports. To maintain an accurate accounting of the sales information, retailers 104 preferably will notify the IMS 100 when consumers 106 return a product. This will be accomplished in substantially the same manner as when retailers 104 provide sales information to the IMS 100, although with returns, the retailers 104 will provide return information rather than sale information. The IMS 100 will then add the products returned to the inventory information maintained on the database, rather than subtracting the number of products as is the case with sales information.

Figure 3:
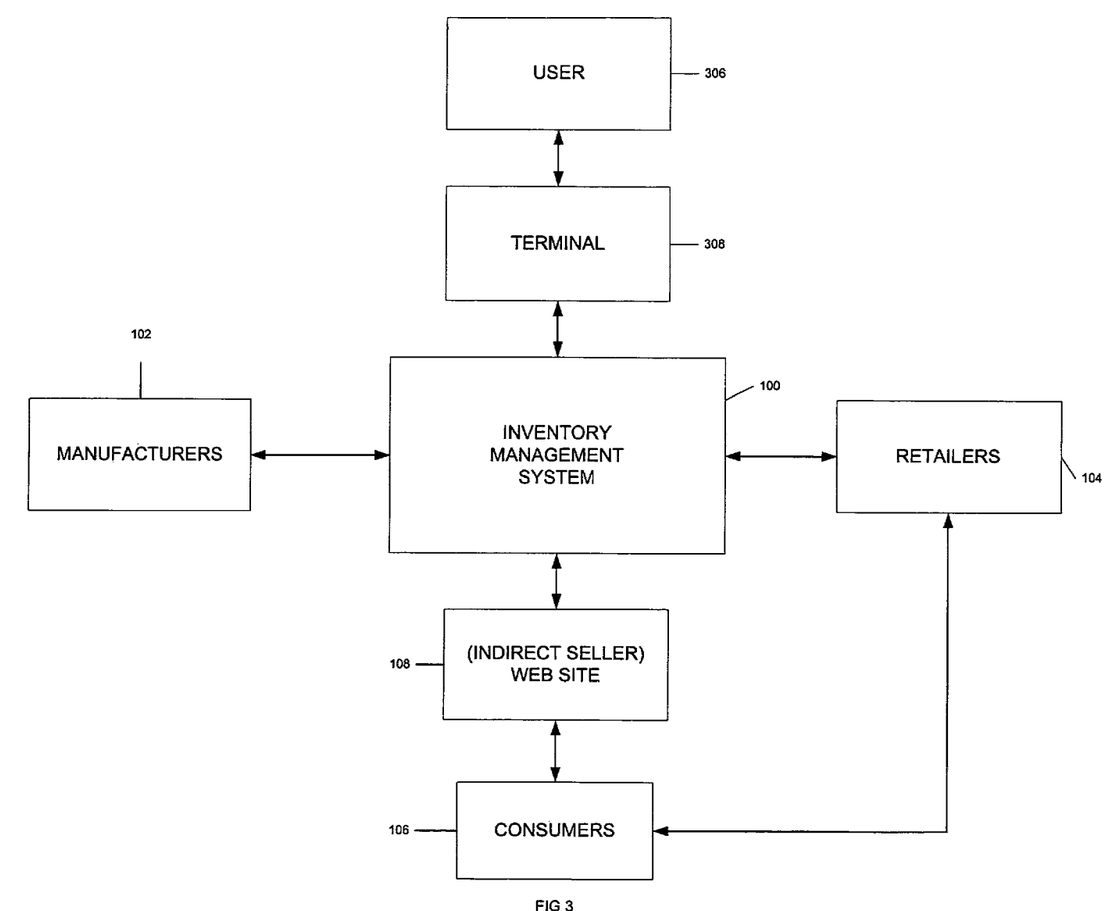
FIG. 3 is a flow chart illustrating an embodiment of the distribution method and system that includes a terminal.

Turning now to FIG. 3, another embodiment of the present inventions is illustrated. In the embodiment shown in FIG. 3, a terminal 308, or kiosk, preferably located at a retail store location. The terminal 308 is any device suitable for interacting with the IMS 100, such as, e.g., a kiosk, a PC, or a wireless device. The terminal 308 will preferably link with a web site interface that is incorporated as part of the IMS 100. A user 306 may use the terminal 308 to transmit requests for product to the IMS 100. The user 306 may do this in order to check whether an alternate retailer has current stock of the requested product. The user 306 may be a consumer or may be a customer service personnel of the retail location or another staff member of the retail location. Typically, the user 306 will use the terminal 308 when the user 306 has failed to find a desired product at the current retail location. The terminal 308 will transmit the user's 306 request to the IMS 100 using a suitable format, such as, e.g., an EDI format, and through a suitable method, such as, e.g., a transmission via a wide area or global computer network, a direct link to the IMS 100, or a wireless communication. The IMS 100 will then analyze its database to determine which retailers 104 currently have stock of the requested product and will determine, of the retailers 104 with stock, the retailer closest to the user's' 306 location. This is accomplished in substantially the same manner as the previously described procedure for determining the closest retailer to a consumer 106 that has current stock of the requested product. After determining the closest retailer to the user 306 with current stock, the IMS 100 transmits the identity of the closest retailer to the terminal 308, via one of the aforementioned formats and methods. The terminal 308 then presents the user 306 with the identity of the closest retailer on a display integrated as part of the terminal 308. The closest retailer, in some cases, may be the retail location in which the terminal 308 is presently located. This may occur, for example, in a situation where the user 306 was unable to find the product although the retail location actually had current stock of the product, either on the sales floor or in storage. In other cases, the closest retailer may be a different retail location than the retail location in which the terminal 308 is situated.

Figure 4:
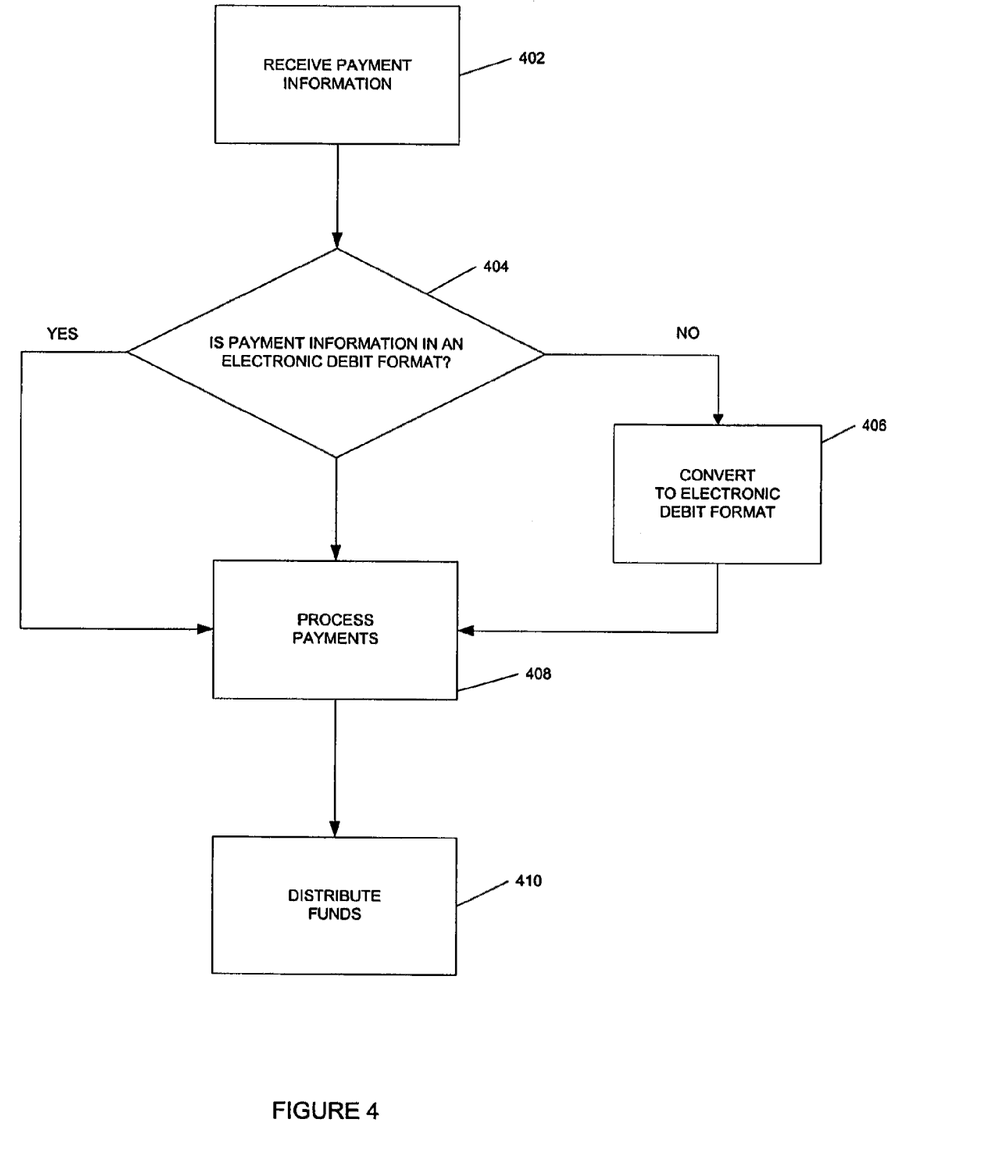
FIG. 4 is a flow chart illustrating the processing of payments for products tracked by the present inventions.

Turning to FIG. 4, the present inventions also process payments from participants in the distribution chain, including manufacturers 102, retailers 104, consumers 106, and indirect sellers 108. Also, the present inventions will process payments from factors, parties that intermediate transactions between manufacturers 102 and retailers 104, when those parties are involved. Payment information is received from retailers 104, consumers 106, and, if applicable, factors (step 402). For example, retailers 104 typically pay for shipments from manufacturers 102 via a line of credit, collect on delivery, or through factors. When factors are used, the payment information is provided by the factor rather than directly by the retailers 104. Payment information is also received from consumers 106. Payment information from consumers 106 may be provided by way of credit card payments, debit card payments, automatic teller machine payments, smart card payments, cashier's check payments, money order payments, personal check payments, cybercash payments, electronic debit payments, or any other suitable means of providing funds to cover requested products. Payment information preferably is transmitted from the retailers 104, the consumers 106, and/or the factors using a wide area or global computer network such as the internet. For example, consumers 106 may provide payment information to an indirect seller 108 by entering the payment information on a suitable form provided on the web site interface, operated by the indirect seller 108, that is incorporated as part of the IMS 100. Alternatively, this payment information may be transmitted by any suitable means such as, e.g., facsimile, telephone, wireless communication, or a direct link from the party providing the payment information. Once payment information is received, a determination is made as to whether the payment information is in an electronic debit format (step 404). If the payment is not in an electronic debit format, the payment information is converted into an electronic debit format (step 406). It is desirable to convert all payment information into an electronic debit format since electronic debit formats receive priority when funds are cleared from accounts at financial institutions. After the payments are converted into an electronic debit format, if necessary, the payment SSC information is further processed by submitting a request to clear the payment with an appropriate financial institution, i.e., the financial institution associated with the particular payment information, to clear the funds for the payment (step 408). Once the funds are cleared from the appropriate financial institution, the funds are distributed to the manufacturers 102 (step 410). The funds may be deposited directly into a financial account of a manufacturer, provided the manufacturer provides appropriate account information. Any funds that are due to the retailers 104, as a result of processing product requests originating from the indirect seller 108, are also distributed to the retailers 104. Additionally, any shipping costs that are due may be electronically paid to the appropriate shipping company.

The present inventions also provide for efficient analysis of shipping and sales information to generate targeted marketing data. In one embodiment of the present inventions, at the end of a predetermined period, the IMS 100 executes a periodic processing of the inventory database to determine discrepancies between the quantity of product shipped by manufacturers to retailers and the quantity of product sold by retailers to consumers. The IMS 100 is then able to provide audit and accounting information to all parties in the distribution chain. This period processing may be accomplished at the end of any definable period, such as, e.g., daily, weekly, monthly, quarterly, biannually, annually, seasonally, etc.

The inventory database maintained by the IMS 100 may also be manipulated and archived to provide for industry and product statistics to manufacturers and retailers. Marketers employed by requesting parties may then access this data to provide superior decision support to company management. The IMS 100 is capable of analyzing the shipping and sales information stored on its database to determine product trends on a local level, such as, e.g., by geographic territory or by demographics, rather than just analyzing trends on a national scale, although the IMS 100 is capable of analyzing trends on a national scale, or even international scale, also. The market data provided by the IMS 100 may then be used by manufacturers and/or retailers to adjust their product inventories. Additionally, the manufacturers may use this market data to remind their associated retailers to restock inventory of certain products or to suggest that their associated retailers stock certain products that the data indicate is in demand in a certain area.

Figure 5:
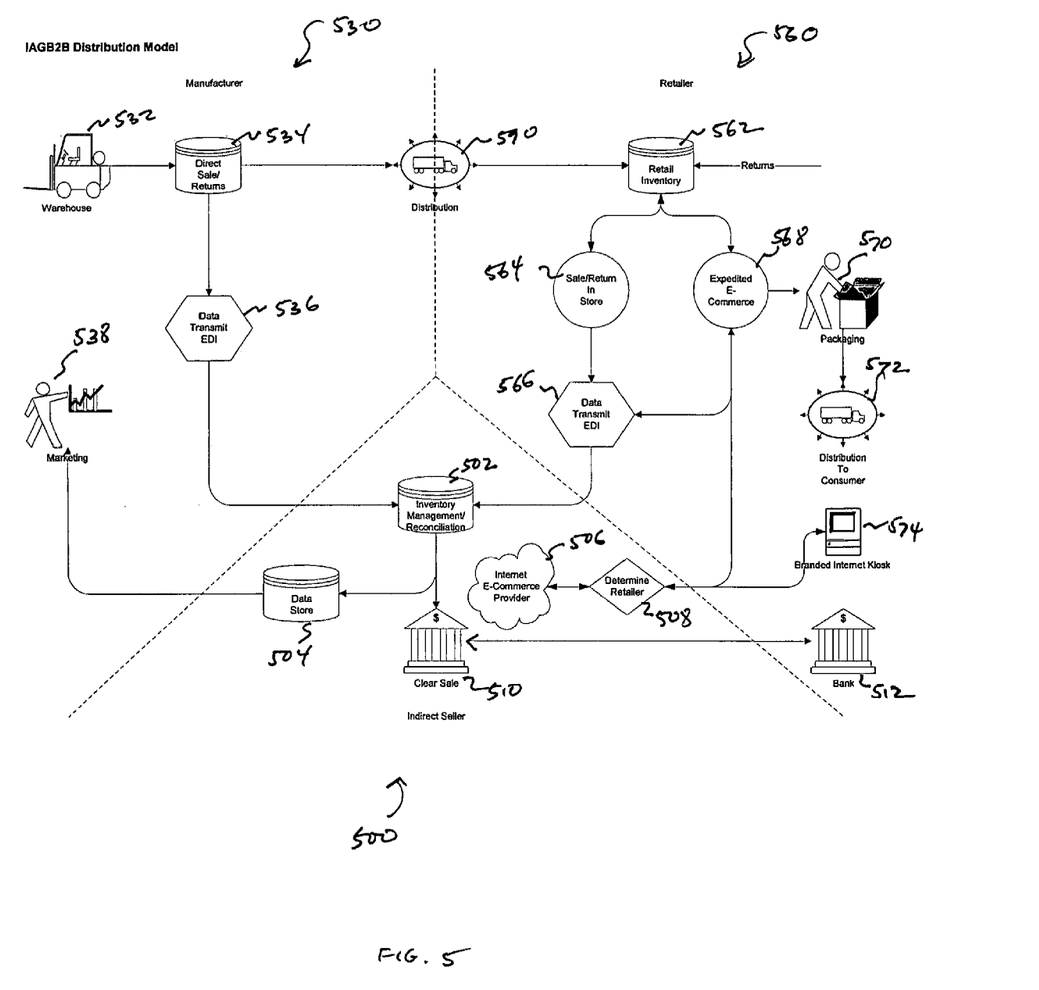
FIG. 5 is a generalized diagram of another embodiment of a distribution model of the present inventions.

FIG. 5 illustrates another embodiment of the distribution method of the present inventions. The various parties of a distribution chain acted on by this embodiment of the distribution method illustrated in FIG. 5 are an inventory management system 500, a manufacturer 530, and a retailer 560. Product inventory movement from a warehouse 532 maintained by the manufacturer 530 to a retailer 560 is categorized as sales or returns 534. The manufacturer 530 then delivers product to the retailer 560 using a suitable distribution method 590. The manufacturer transmits 536 the shipping information to the inventory management system 500 using an appropriate data transmission format, such as, e.g., EDI. The inventory management system 500 contains an inventory management/reconciliation component 502 that receives and maintains the shipping information. This shipping information is stored in a database 504.

An indirect seller 506, such as, e.g., an internet ecommerce provider, operates a web site that enables consumers to request product. The web site is interfaced with, and preferably a component of, the inventory management system 500. Additionally, a terminal or kiosk 574 that interfaces with the inventory management system 500 may be located with a retailer's 560 physical location. A user of the terminal 574 will be able to submit requests for product to the inventory management system 500 while at a physical store location. This enables a user to locate an alternate retailer with available stock of a certain product when that particular product is not found at the current retailer's 560 store. The terminal 574 is linked to the inventory management system 500 and transmits user requests to the system 500 in an appropriate manner, such as, e.g., a connection via a wide area or global computer network, a wireless communication, or a direct link. After receiving a consumer request for product, from the indirect seller 506 via the web site, or a request from a user utilizing the terminal 574, the inventory management system 500 access the inventory management/reconciliation component 502 to determine 508 a retailer 560 to forward the request. The retailer 560 is determined by choosing the closest retailer to the consumer with current stock of the requested product and is displayed to the consumer via the web site of the indirect seller 506 or a display on the terminal 574, if the terminal 574 is used to transmit the request. If no retailer is available, the inventory management system 500 preferably notifies the indirect seller 506 who subsequently notifies the consumer of a lack of available stock. This notice will be displayed to the consumer using the web site of the indirect seller 506, or to the user of a terminal 574 via a display on the terminal 574.

After receiving a request from the inventory management system 500, the retailer 560 retrieves the product from retail inventory 562 and prepares the product for fulfillment. In one alternative, the consumer physically retrieves 564 the product from the retail location. After the consumer retrieves the product, the retailer 560 provides information on this sale to the inventory management system 500 through a suitable format, such as, e.g., an EDI communication 566. In another alternative, the retailer 560 ships 568 the product to the consumer. Here, the retailer 560 preferably packages 570 the product into branded packaging provided by the indirect seller 506 and arranges for a shipping company 572 to distribute the package to the consumer. Additionally, to increase consumer convenience, the consumer will have the opportunity to return product to the retailer 560. After the consumer returns a product, the retailer 560 provides information on the return to the inventory management system 500 through a suitable format, such as, e.g., an EDI communication 566.

The inventory management system 500 also contains a payment processing component 510 for clearing payments received from consumers, for purchased' products, and from retailers and/or factors, for products shipping to retailers from manufacturers. The payment processing component 510 receives payment information, converts the payment information to an electronic debit format if necessary, and arranges for fund transfers to and from appropriate financial institution 512. Additionally, the inventory management system 500 is capable of analyzing the sales and shipping information stored in the database 504 in order to provide targeted marketing and up to date sales information to marketing personnel 538 associated with the manufacturer 530. This marketing and sales information will also be available to other parties, such as, e.g., retailers or other interested marketing entities, upon request.

The foregoing description of the present inventions has been presented for purposes of illustration and description. It is not intended to be exhaustive or to limit the present inventions to the precise forms disclosed.

The invention claimed is:

1. A method, comprising:

Using a server computer which is programmed to receive an order over the Internet, via a web-based interface, said order received from a consumer, said order specifying at least one product to be purchased;

Said programming on said server computer causing said receiving payment information from said consumer over the Internet;

based on said receiving said order and said payment, using said programming on said computer for determining one of a plurality of different order fulfillment locations to send said at least one product to said consumer;

said programming on said computer controlling sending contents from said order, from said one of said order fulfillment locations based on said determining, to the consumer, using a shipping method;

subsequent to said sending, using said programming on said computer for receiving information indicative of the consumer having returned to return the contents from said order to a local retailer, where said local retailer is different than said server and different from said one of said order fulfillment locations;

responsive to said consumer returning said contents, using said programming on said computer for refunding the payment received as part of said payment information;

maintaining an inventory management system in a computer using programming that determines for said plurality of fulfillment locations, amounts of inventory maintained at least at a plurality of said fulfillment locations; and storing, in said inventory management system, information indicative of inventory at local retailers, and also storing information indicative of other local retailers, and using said information to select one of said retailers to send said products, and using said refund of said item to increase an indication of a number of items stored at said retailer in said inventory management system, where said programming maintains information which, for plural different items in said inventory management system, indicates whether said items are from returns.

2. A method as in claim 1, wherein said determining comprises determining an order fulfillment location to send said product which is physically closest to said consumer.

3. A method as in claim 1, wherein said determining comprises determining an order fulfillment location to send said product which is within a specified mailing time to said consumer.

4. A method as in claim 1, further comprising analyzing information indicative of orders to determine product trends based on geographic territory on a local level associated with order fulfillment locations and providing data which reminds said retailers to stock certain products which are in demand in a certain area.

5. A method as in claim 1, further comprising analyzing information indicative of orders to determine product trends based on demographics on a local level associated with order fulfillment locations and providing data which reminds said retailers to stock certain products which are in demand in a certain area.

6. A system, comprising:

an Internet server, running a program having a web-based interface, capable of receiving an order from a consumer, where said order specifies at least one product to be purchased, and which also receives payment information from said consumer over the Internet;

an inventory management system, maintaining information indicative of inventory, and determining one of a plurality of different order fulfillment locations to send said at least one product to said consumer, and sending information to said one order fulfillment location, indicating that said order should be sent to said consumer using a shipping method;

a return system, which determines that the consumer has returned the contents from said order to a local retailer different than said server and different from said one of said order fulfillment locations, and responsive to said consumer returning said contents, refunding the payment received as part of said payment information, and using said refunding to increase an indication of a number of items stored at said retailer in said inventory management system, and where said inventory management system maintains information which, for plural different items in said inventory management system, indicates whether said items are from returns.

7. A system as in claim 6, wherein said order fulfillment locations have different names than a name associated with said server which receives said order, and wherein said order fulfillment location receives said name associated with said server.

8. A system as in claim 7, further comprising a system that receives information indicative of packaging the at the order fulfillment location using said name associated with said server.

9. A system as in claim 6, wherein said internet server analyzes information indicative of orders to determine product trends based on geographic territory on a local level associated with order fulfillment locations and providing data which reminds said retailers to stock certain products which are in demand in a certain area.

10. A system as in claim 6, wherein said internet server analyzes information indicative of orders to determine product trends based on demographics on a local level associated with order fulfillment locations and providing data which reminds said retailers to stock certain products which are in demand in a certain area.

* * * * *